United States Patent
O'Docherty

[11] Patent Number: 6,017,057
[45] Date of Patent: Jan. 25, 2000

[54] INFLATABLE VEHICLE OCCUPANT PROTECTION DEVICE

[75] Inventor: James K. O'Docherty, Mesa, Ariz.

[73] Assignee: TRW Inc., Lyndhurst, Ohio

[21] Appl. No.: 09/039,345

[22] Filed: Mar. 13, 1998

[51] Int. Cl.⁷ .......................... B60R 21/26; B60R 21/30
[52] U.S. Cl. ................................. 280/739; 280/737
[58] Field of Search ........................ 280/737, 743.1, 280/738, 728.1, 739

[56] References Cited

U.S. PATENT DOCUMENTS

| | | |
|---|---|---|
| 3,887,213 | 6/1975 | Goetz . |
| 4,169,613 | 10/1979 | Barnett . |
| 4,360,223 | 11/1982 | Kirchoff . |
| 4,500,114 | 2/1985 | Grey, Jr. . |
| 4,805,930 | 2/1989 | Takada . |
| 5,007,662 | 4/1991 | Abramczyk et al. . |
| 5,114,180 | 5/1992 | Kami et al. . |
| 5,219,179 | 6/1993 | Eyrainer et al. . |
| 5,310,215 | 5/1994 | Wallner ................................ 280/739 |
| 5,447,330 | 9/1995 | Tagawa et al. ........................ 280/739 |
| 5,492,363 | 2/1996 | Hartmeyer et al. .................... 280/739 |
| 5,518,269 | 5/1996 | Storey et al. ......................... 280/739 |
| 5,536,038 | 7/1996 | Bollaert et al. . |
| 5,542,695 | 8/1996 | Hanson ................................ 280/739 |
| 5,603,526 | 2/1997 | Buchanan ............................ 280/739 |
| 5,704,639 | 1/1998 | Cundilt et al. ....................... 280/739 |

FOREIGN PATENT DOCUMENTS

| | | |
|---|---|---|
| 0423981A1 | 4/1991 | European Pat. Off. . |
| 0495410A1 | 7/1992 | European Pat. Off. . |
| 2542764A1 | 4/1977 | Germany . |
| 4306615A1 | 9/1994 | Germany . |

Primary Examiner—Lanna Mai
Assistant Examiner—Jeff Restifo
Attorney, Agent, or Firm—Tarolli, Sundheim, Covell, Tummino & Szabo L.L.P.

[57] ABSTRACT

An inflatable vehicle occupant protection device (14) includes a panel (56) and a patch (80) attached to the panel (56). The panel (56) has slits (62) defining inflation fluid vents. The patch (80) has slits (84) defining inflation vents in series with the vents in the panel (56).

5 Claims, 5 Drawing Sheets

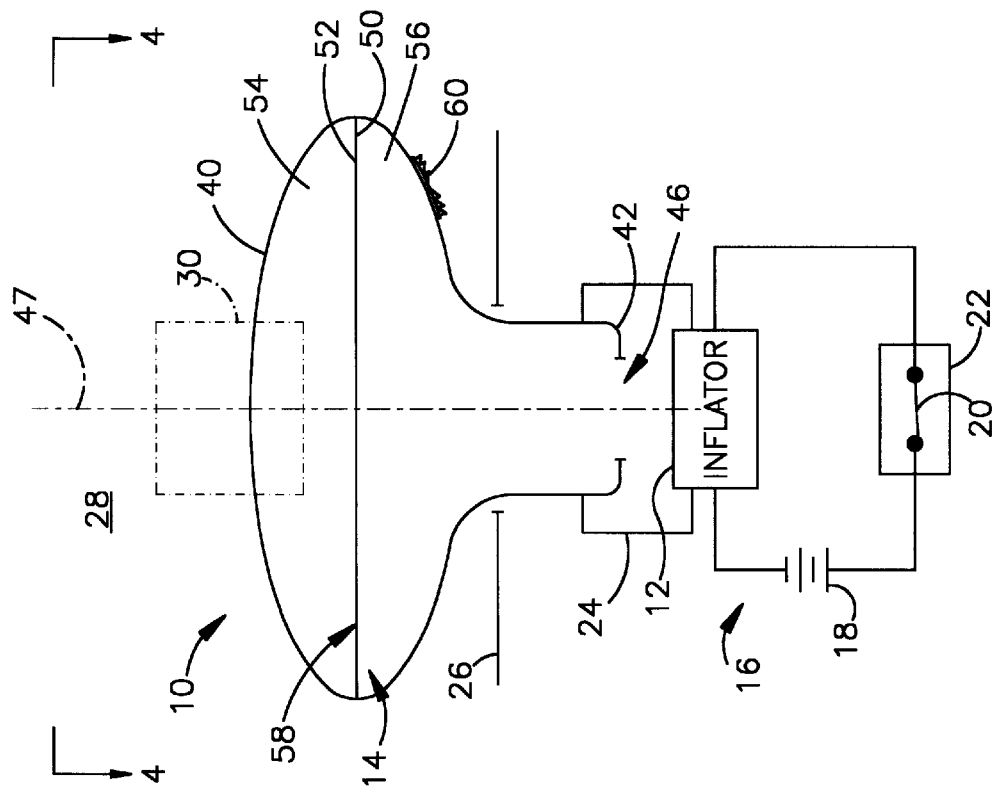
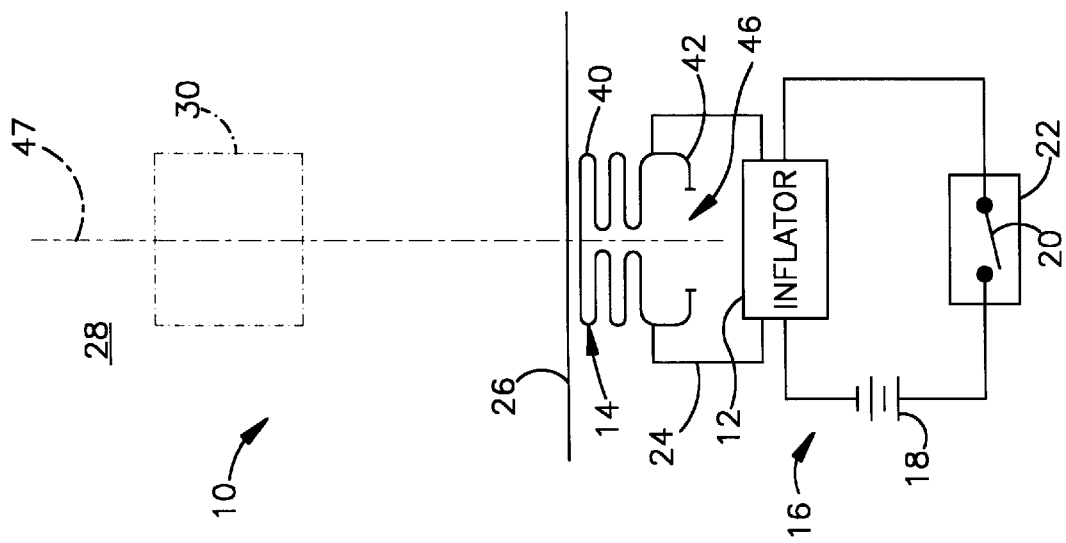

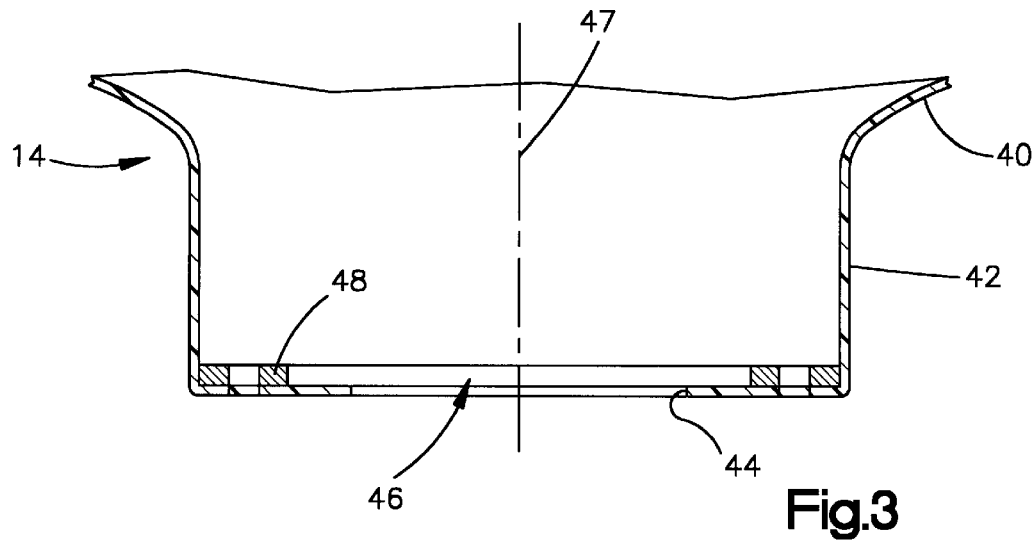
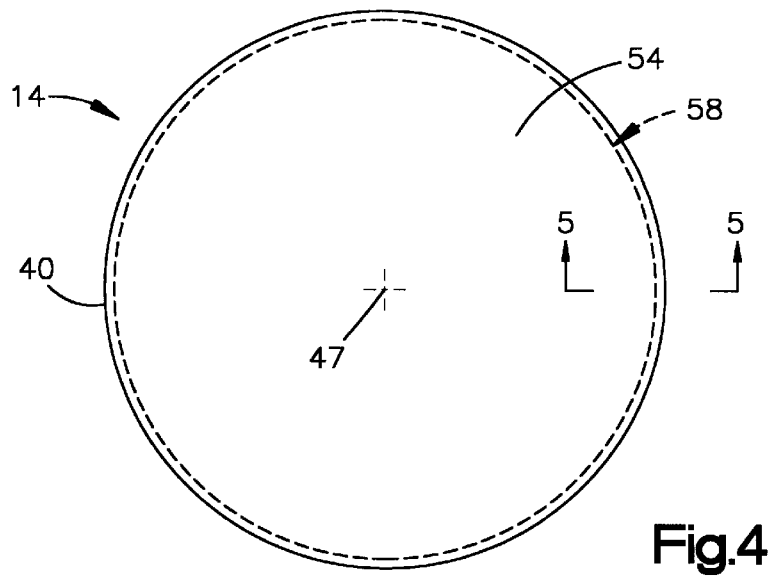
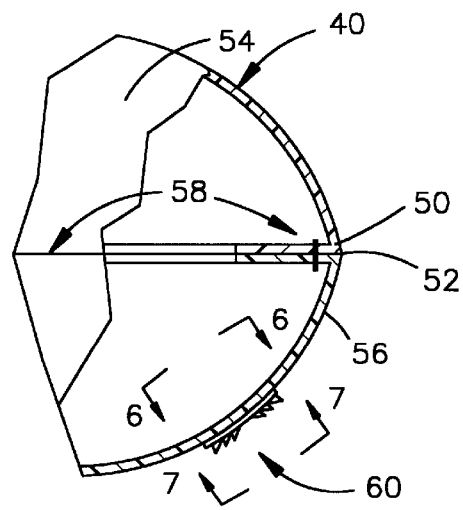

INFLATABLE VEHICLE OCCUPANT PROTECTION DEVICE

FIELD OF THE INVENTION

The present invention relates to an inflatable vehicle occupant protection device with a fluid pressure relief valve.

BACKGROUND OF THE INVENTION

An inflatable vehicle occupant protection device, such as an air bag, is stored in a vehicle in a folded, uninflated condition at a location adjacent to the vehicle occupant compartment. When the air bag is to be inflated, inflation fluid is directed to flow from an inflator into the air bag. The fluid inflates the air bag from the folded, uninflated condition to an unfolded, inflated condition in which the air bag extends into the vehicle occupant compartment.

The inflating air bag engages an occupant of the vehicle to help protect the occupant from a forceful impact with parts of the vehicle. The manner in which the air bag engages the occupant is determined in part by the pressure of the inflation fluid in the air bag. Therefore, it is sometimes desirable to vent inflation fluid from the inflating air bag.

SUMMARY OF THE INVENTION

In accordance with the present invention, an inflatable vehicle occupant protection device includes a panel and a patch attached to the panel. The panel has slits defining inflation fluid vents. The patch has slits defining inflation fluid vents in series with the vents in the panel.

In a preferred embodiment of the present invention, the patch is joined to the panel along a seam that encircles the vents in the panel. The slits in the patch extend generally coextensively along the slits in the panel. Each slit in the panel defines a free edge of a respective vent flap in the panel. Each slit in the patch likewise defines a free edge of a respective vent flap in the patch. In this arrangement, the vent flaps in the panel and the vent flaps in the patch are alike and are arranged in overlapping pairs.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of an apparatus including an inflatable vehicle occupant protection device comprising a first embodiment of the present invention;

FIG. 2 is a view similar to FIG. 1 showing the apparatus in an actuated condition;

FIG. 3 is an enlarged, partial cross-sectional view of the protection device of FIGS. 1 and 2;

FIG. 4 is a view taken on line 4—4 of FIG. 2;

FIG. 5 is a view take on line 5—5 of FIG. 4;

Description of Preferred Embodiments

Figure 6:
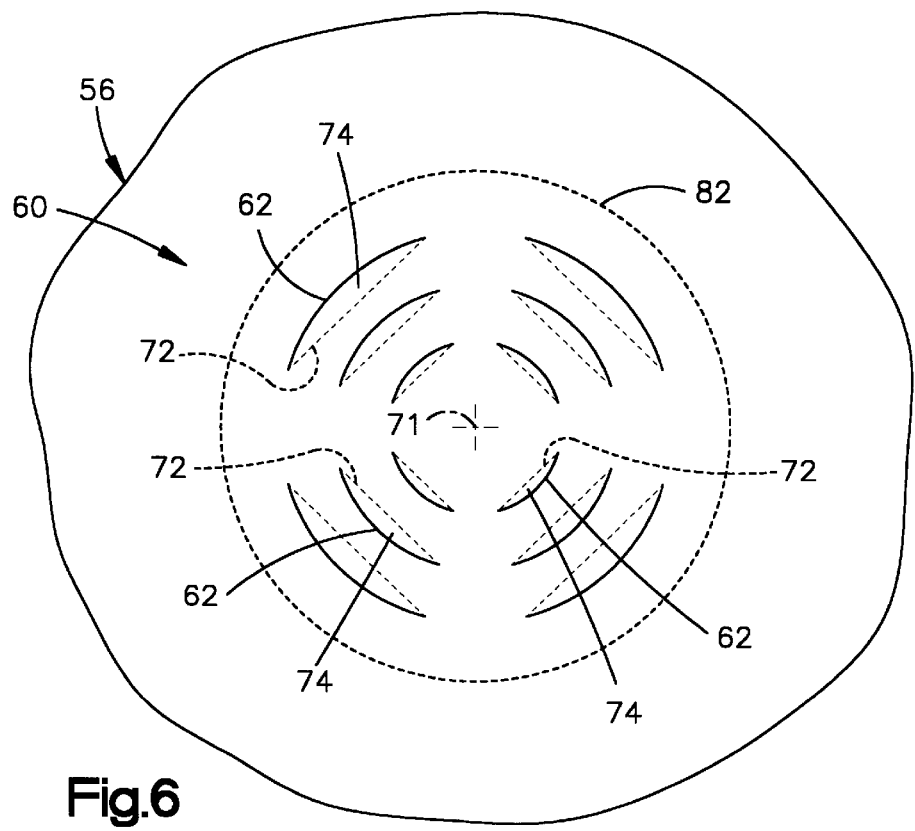
FIG. 6 is a view taken on line 6—6 of FIG. 5.

A vehicle occupant protection apparatus 10 comprising a first embodiment of the present invention is shown schematically in FIGS. 1 and 2. The apparatus 10 includes an inflator 12 and a particular type of inflatable vehicle occupant protection device 14 which is known as an air bag. The air bag 14 is inflatable from a folded, uninflated condition, as shown in FIG. 1, to an unfolded, inflated condition, as shown in FIG. 2. Other inflatable vehicle occupant protection devices that can be used in accordance with the present invention include inflatable seat belts, inflatable knee bolsters, inflatable head liners or side curtains, and knee bolsters operated by inflatable air bags.

The inflator 12 comprises a source of inflation fluid for inflating the air bag 14. As known in the art, the inflator 12 may contain an ignitable gas generating material for generating a large volume of gas. The inflator 12 may alternatively contain a stored quantity of pressurized inflation fluid, or a combination of pressurized inflation fluid and ignitable material for heating the inflation fluid.

As shown schematically in FIG. 1, the inflator 12 is included in an electrical circuit 16 with a power source 18 and a normally open switch 20. The power source 18 is preferably the vehicle battery and/or a capacitor. The switch 20 is part of a sensor 22 which senses a condition indicating the occurrence of a vehicle crash. The crash-indicating condition may comprise, for example, sudden vehicle deceleration that is caused by a crash. If the crash-indicating condition is at or above a predetermined threshold level, it indicates the occurrence of a crash having at least a predetermined threshold level of severity. The threshold level of crash severity is a level at which inflation of the air bag 14 is desired to help protect an occupant of the vehicle. The switch 20 then closes and electric current is directed through the inflator 12 to actuate the inflator 12. As a result, the inflator 12 rapidly emits a large volume of inflation fluid which flows into the air bag 14 to inflate the air bag 14.

The air bag 14 and the inflator 12 are mounted on a supporting structure 24 which, in turn, is mounted on a part 26 of the vehicle adjacent to the vehicle occupant compartment 28. The supporting structure 24 could be a reaction plate, a reaction canister, a manifold, or the like. Accordingly, the part 26 of the vehicle on which the supporting structure 24 is mounted could be the steering wheel or steering column, the instrument panel, a door panel, or the like. Moreover, the air bag 14 is located in the vehicle with reference to a predetermined occupant position 30 in the occupant compartment 28. As viewed from above in FIGS. 1 and 2, the inflating air bag 14 moves toward the predetermined occupant position 30 to restraint movement of a vehicle occupant in the opposite direction toward the part 26 of the vehicle on which the air bag 14 is mounted.

The air bag 14 is constructed of one or more panels of any suitable air bag material known in the art, including woven materials and plastic films. The panels of air bag material are interconnected along seams that are formed by stitches, ultrasonic welds, adhesives, heat-staking, or the like, depending on the particular air bag material of which the panels are formed. Preferably, the air bag 14 is constructed of panels formed of a nylon fabric which is coated with silicone.

The air bag 14 has a body 40 and a neck 42. When the air bag 14 is being inflated, the body 40 is moved from the vehicle part 26 into the vehicle occupant compartment 28. The neck 42 is retained on the vehicle part 26 by the supporting structure 24.

As shown by way of example in FIG. 3, the neck 42 has a generally cylindrical shape with a circular inner edge 44. The inner edge 44 defines a circular inlet opening 46 with a central axis 47. A retainer ring 48 is used with fasteners (not shown) to fasten and retain the neck 42 on the supporting structure 24 (FIG. 1) in a known manner, with the inlet opening 46 being located in a position to receive the inflation fluid emitted from the inflator 12. The neck 42 and the inlet opening 46 may alternatively have any other suitable shape, such as a square or rectangular shape.

The body 40 of the air bag 14 also may have any suitable shape, depending upon the particular location of the air bag 14 in the vehicle. In the first embodiment of the present invention, the body 40 has a curvilinear peripheral shape, as viewed in FIG. 4, when the air bag 14 is in the fully inflated condition of FIG. 2. More specifically, the body 40 in the first embodiment has a circular peripheral shape centered on the axis 47 when it is unfolded and inflated fully outward from the neck 42, as viewed in FIG. 4.

The circular peripheral shape of the body 40 is defined by adjoining, circular peripheral edges 50 and 52 of two adjacent panels 54 and 56. A circumferentially extending seam 58 (shown schematically) joins the first and second panels 54 and 56 to each other adjacent to their circular peripheral edges 50 and 52. When the air bag 14 has been inflated outward from the vehicle part 26, as shown in FIG. 2, the first panel 54 faces outward from the vehicle part 26 toward the predetermined occupant position 30. The second panel 56 faces inward toward the vehicle part 26.

In accordance with the present invention, the air bag 14 has at least one pressure relief valve 60. As viewed in FIGS. 2 and 5, the air bag 14 has a single pressure relief valve 60 which is located at the second panel 56. As viewed from inside the air bag 14 in FIG. 6, the valve 60 includes a plurality of slits 62 in the second panel 56. Each slit 62 is cut fully through the second panel 56 to define a vent for the passage of inflation fluid outward through the second panel 56. Although the configurations and arrangement of the silts 62 could vary, the slits 62 in the first embodiment of the present invention are configured as arcuate segments centered on an axis 71, and are arranged in three concentric circular arrays. Each circular array includes four slits 62 of equal length at locations that are evenly spaced apart circumferentially about the axis 71. A corresponding fold line 72 extends between the opposite ends of each slit 62. The panel 56 thus has a plurality of vent flaps 74, with each vent flap 74 having a hinge defined by respective fold line 72, and having a free edge defined by a respective slit 62.

Figure 7:
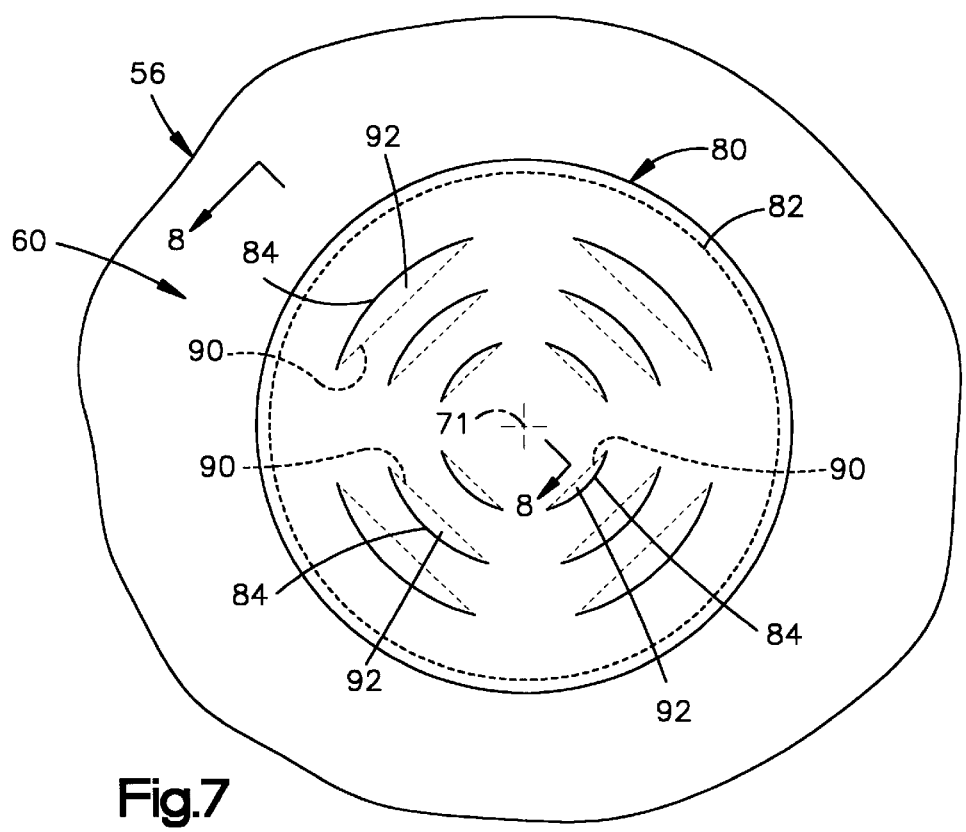
FIG. 7 is a view taken on line 7—7 of FIG. 5.

As viewed from outside the air bag 14 in FIG. 7, the pressure relief valve 60 further includes a patch 80 for reinforcement of the panel 56. The patch 80 is attached to the panel 56 along a seam 82. The seam 82 extends fully and continuously about the periphery of the patch 80, and encircles the slits 62 (FIG. 6) in the panel 56.

The patch 80 has a plurality of slits 84. The slits 84 in the patch 80 define a corresponding plurality of vents which are in series, from the standpoint of fluid flow out of the air bag 14, with the vents defined by the slits 62 in the panel 56. The slits 84 in the patch 80 also are configured as arcuate segments centered on the axis 71, and are of the same number, size and arrangement as the slits 62 in the panel 56.

Each slit 84 in the patch 80 thus extends coextensively along a corresponding slit 62 in the panel 56. The patch 80 also has a plurality of fold lines 90, each of which extends between the opposite ends of a corresponding slit 84 to define a hinge for a respective vent flap 92. In this arrangement, the vent flaps 92 in the patch 80 and the vent flaps 74 in the panel 56 are alike and are arranged in overlapping pairs.

Figure 9:
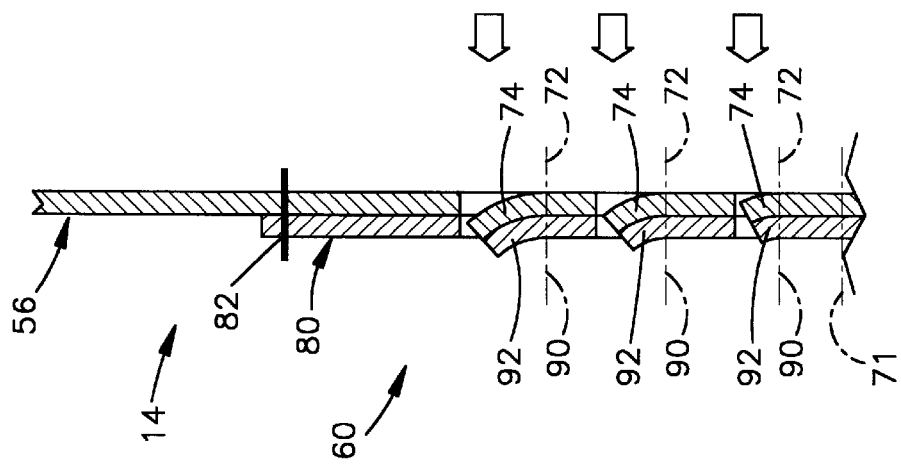
FIG. 9 is a view similar to FIG. 8 showing parts in different positions.
Figure 8:
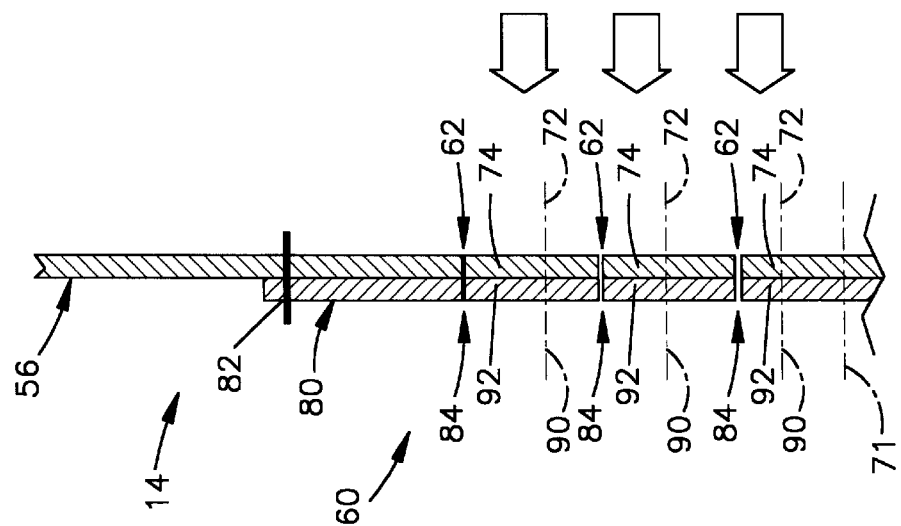
FIG. 8 is a view taken on line 8—8 of FIG. 7.

The pressure of the inflation fluid flowing into the air bag 14 acts outwardly against the first and second panels 54 and 56. This is indicated by the arrows shown in FIGS. 8 and 9. The force of the pressure acting outward against the second panel 56 at the valve 60 depends on factors such as, for example, the severity of the crash and the weight of the vehicle occupant interacting with the inflating air bag 14. When the pressure acts outwardly against the panel 56 in this manner, it deflects each pair of overlapping vent flaps 74 and 92 pivotally outward so as to open the vent defined by the respective pair of slits 62 and 84. This provides inflation fluid pressure relief for the air bag 14.

Figure 10:
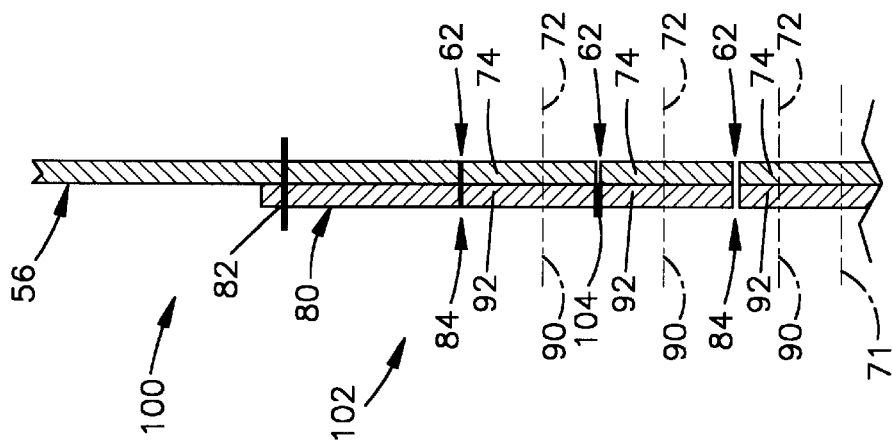
FIG. 10 is a view similar to FIG. 8 showing parts of an inflatable vehicle occupant protection device comprising a second embodiment of the present invention.

A second embodiment of the present invention includes a vehicle occupant protection device 100, as shown partially in FIG. 10. The protection device 100 has a pressure relief valve 102 with many parts that are substantially the same as corresponding parts of the valve 60 described above. This is indicated by the use of the same reference numbers for such parts in FIGS. 10 and 8. Accordingly, the valve 102 includes a panel 56 with slits 62 defining inflation fluid vents, and includes a patch 80 with slits 84 defining inflation fluid vents in series with the vents in the panel 56.

The valve 102 in the second embodiment further includes at least one seam 104 which closes a corresponding vent 84 in the patch 80. The seam 104 is constructed so as to be rupturable under the influence of a predetermined inflation fluid pressure force acting outward against the valve 102. This enables the outlet flow area of the valve 102 to increase when the inflation fluid pressure forces increase to the predetermined elevated level. Any one or more of the vents defined by the other slits 84 and 62 also could be closed by a seam like the seam 104, or by a seam that ruptures under the influence or a greater or lesser inflation fluid pressure force. The outlet flow area of the valve 102 would vary accordingly.

Figure 11:
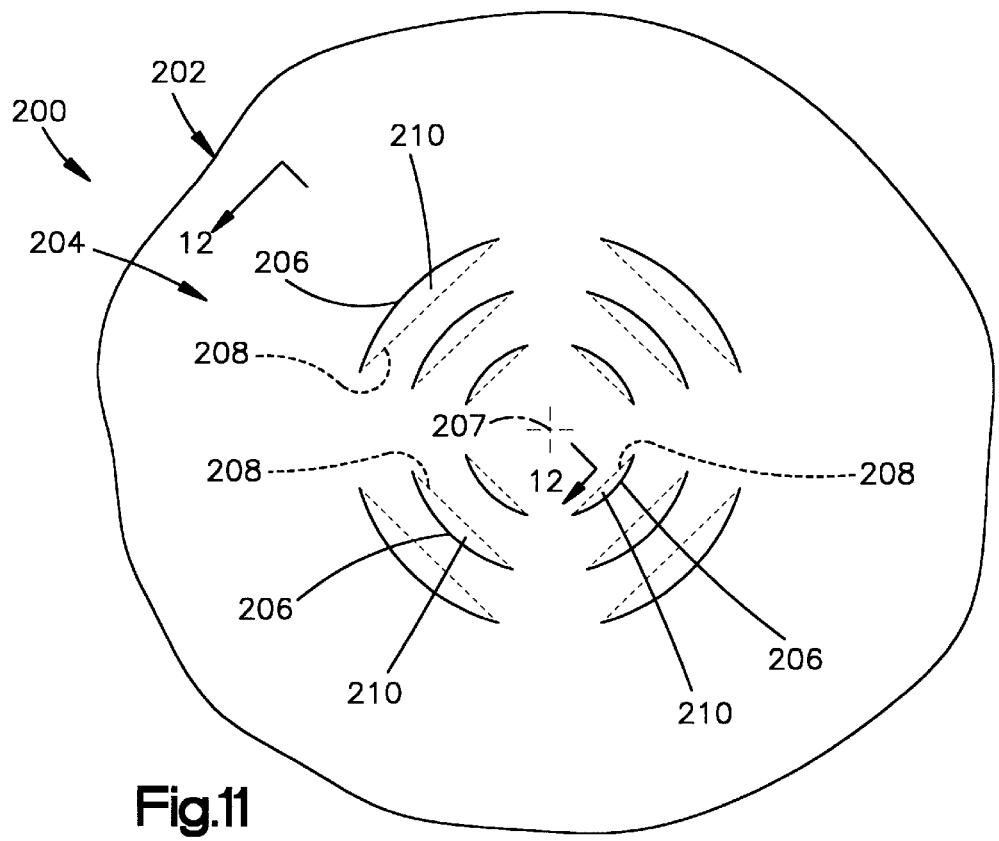
FIG. 11 is a view similar to FIG. 7 showing a portion of an inflatable vehicle occupant protection device comprising a third embodiment of the present invention.
Figure 12:
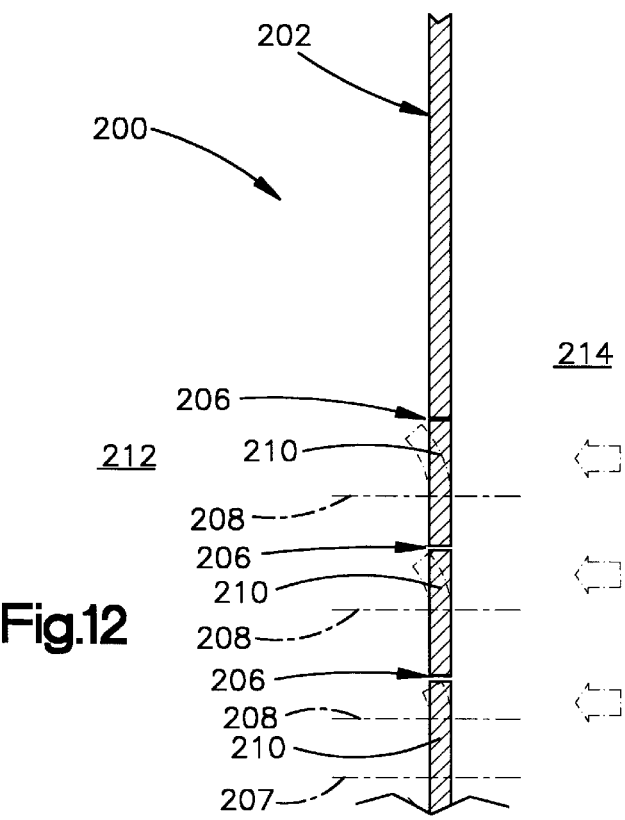
FIG. 12 is a view taken on line 12—12 of FIG. 11.

A third embodiment of the present invention is shown partially in FIGS. 11 and 12. In the third embodiment, an air bag 200 like the air bag 14 has an alternative second panel 202 in place of the second panel 56 described above. The air bag 200 further has a pressure relief valve 204 which is defined entirely by the panel 202.

As viewed from outside the air bag 200 in FIG. 11, the valve 204 comprises a plurality of slits 206 in the panel 202. Each slit 206 is cut fully through the panel 202 to define a vent for the passage of inflation fluid outward through the panel 202. Although the configurations and arrangement of the slits 206 could vary, the slits 206 in the third embodiment of the present invention also are configured as arcuate segments centered on an axis 207, and are arranged in three concentric circular arrays. Each circular array includes four slits 206 of equal length at locations that are evenly spaced apart circumferentially about the axis 207. A corresponding fold line 208 extends between the opposite ends of each slit 206. The panel 202 thus has a plurality of vent flaps 210, with each vent flap 210 having a hinge defined by a respective fold line 208, and having a free edge defined by a respective slit 206.

As shown in FIG. 12, each slit 206 in the panel 202 is cut fully through the panel 202. Moreover, the air bag 200 does not include a patch extending over the area of the panel 202 where the slits 206 are located. Accordingly, when the air bag 200 is being inflated into a vehicle occupant compartment 212 like the vehicle occupant compartment 28 (FIGS. 1 and 2), the slits 206 communicate the interior 214 of the air bag 200 directly with the vehicle occupant compartment 212. This enables inflation fluid to flow directly from the slits 206 into the vehicle occupant compartment 212 without the constraint or further flow-regulating effect that would otherwise be provided by such a patch. As in the second embodiment of the present invention, one or more of the slits 206 can be closed by a rupturable seam so that the outlet flow area through the valve 204 can vary in the manner described above with reference to the valve 102.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

an inflatable vehicle occupant protection device including a panel and a patch attached to said panel;

said panel having slits defining inflation fluid vents;

said patch having slits defining inflation fluid vents aligned with and in series with said vents in said panel and;

each of said slits in said panel defining a free edge of a respective vent flap in said panel, each of said slits in said patch defining a free edge of a respective vent flap in said patch, said slits in said patch being arranged to extend generally co-extensively along said slits in said panel such that said vent flaps in said panel and said vent flaps in said patch are alike and are arranged in overlapping pairs.

2. Apparatus as defined in claim 1 wherein said patch is joined to said panel along a seam that encircles the vents in said panel and the vents in said patch.

3. Apparatus as defined in claim 1 wherein at least one of said vents is closed by a seam which is rupturable under the influence of a predetermined inflation fluid pressure force.

4. Apparatus as defined in claim 1 wherein said slits are configured as arcuate segments.

5. Apparatus as defined in claim 4 wherein said slits are arranged in a plurality of concentric arrays of circumferentially spaced arcuate segments.

* * * * *